United States Patent [19]
Luy et al.

[11] Patent Number: 5,868,807
[45] Date of Patent: Feb. 9, 1999

[54] APPARATUS FOR REMOVING DUST FROM GAS AND FOR CLEANING AT LEAST ONE FILTER OF THE APPARATUS

[75] Inventors: Bernhard Luy, Freiburg; Matthias Tondar, Hausen i.W., both of Germany

[73] Assignee: Glatt GmBH, Binzen, Germany

[21] Appl. No.: 773,329

[22] Filed: Dec. 23, 1996

[30] Foreign Application Priority Data

Dec. 29, 1995 [CH] Switzerland .......................... 03707/95

[51] Int. Cl.⁶ ................................................ B01D 46/04
[52] U.S. Cl. ................................. 55/302; 55/410; 55/417; 55/486; 55/487; 55/492; 55/508; 55/525; 95/229
[58] Field of Search .............................. 55/242, 378, 379, 55/410, 417, 486, 487, 488, 489, 492, 498, 508, 302, 523, 525; 95/278, 279, 280, 281; 210/106, 107, 108, 453, 454, 510.1

[56] References Cited

U.S. PATENT DOCUMENTS

| | | | |
|---|---|---|---|
| 1,767,056 | 6/1930 | Donnelly | 55/417 |
| 3,535,853 | 10/1970 | Brown et al. | 55/508 |
| 3,807,143 | 4/1974 | Dunn | 55/242 |
| 4,451,962 | 6/1984 | Cornelsen et al. | 210/510.1 |
| 4,645,520 | 2/1987 | Huttlin | |
| 4,731,100 | 3/1988 | Loeffelmann et al. | 95/281 |
| 4,973,458 | 11/1990 | Newby et al. | 55/302 |
| 5,251,384 | 10/1993 | Olsen et al. | 55/302 |
| 5,332,448 | 7/1994 | Phillips | 95/279 |
| 5,423,977 | 6/1995 | Aoki et al. | 210/107 |
| 5,549,734 | 8/1996 | Stanpard | 95/280 |

FOREIGN PATENT DOCUMENTS

| | | |
|---|---|---|
| 33 41 786 | 6/1985 | Germany . |
| 39 41 321 | 6/1991 | Germany . |
| WO 91/03306 | 3/1991 | WIPO . |

*Primary Examiner*—Jay H. Woo
*Assistant Examiner*—Minh-Chau T. Pham
*Attorney, Agent, or Firm*—Jacobson, Price, Holman & Stern, PLLC

[57] ABSTRACT

The apparatus has a container, which encloses a crude gas space, and at least one filter projecting into the crude gas space and having a filter axis and a shape-stable casing. This has a support member with two wire fabrics and a filtration member which forms its outer surface and has a wire fabric. The wire fabrics of the support member and of the filtration member are rotationally symmetrical with the filter axis, are adjacent to one another and are sintered with one another at the points of contact. When process gas is passed from the crude gas space through a filter, the process gas deposits dust present in it onto the outer surface of the casing. The or each filter is stable, durable and resistant to high or low temperatures and can be readily cleaned inside the container with a cleaning gas or a cleaning liquid.

27 Claims, 3 Drawing Sheets

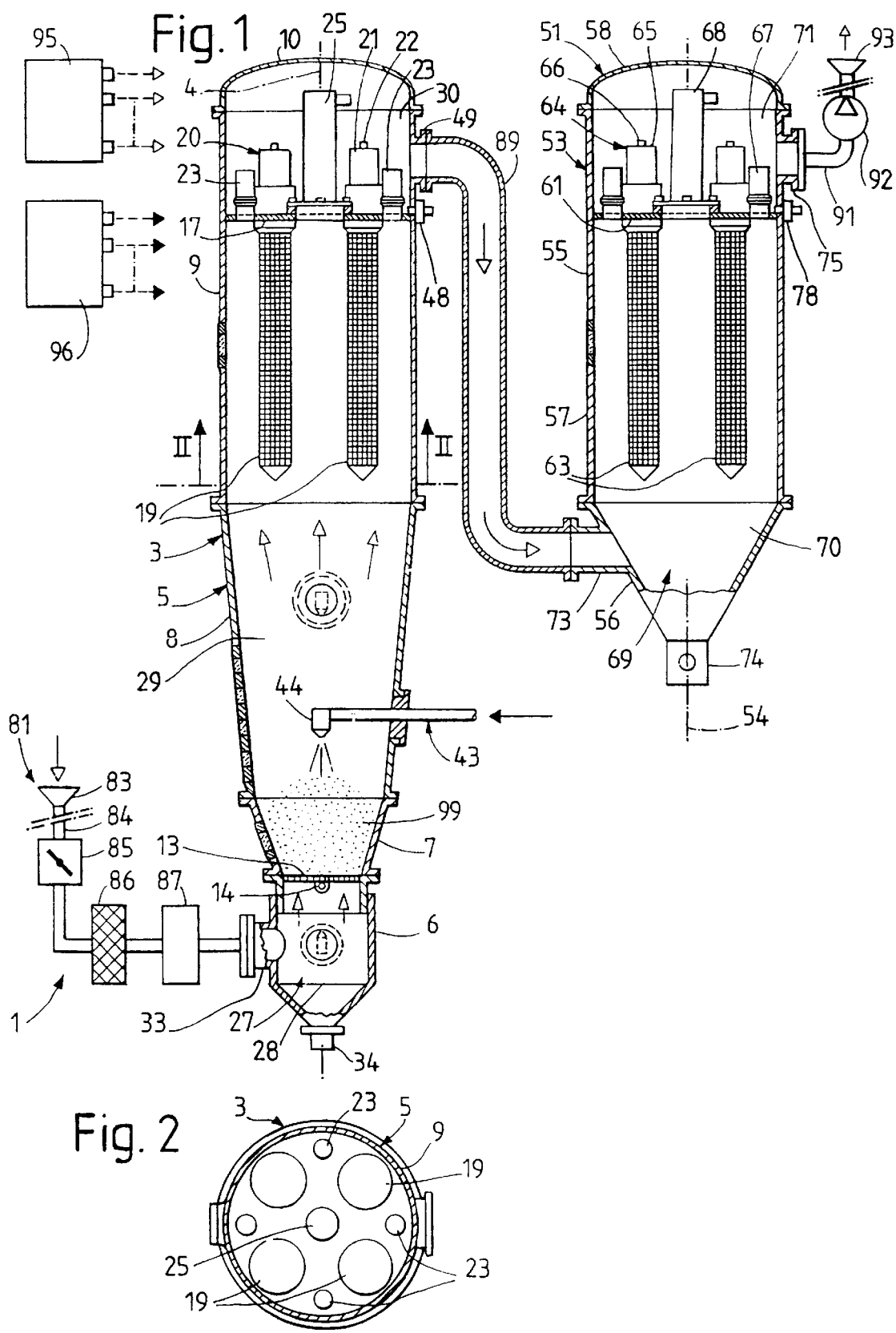

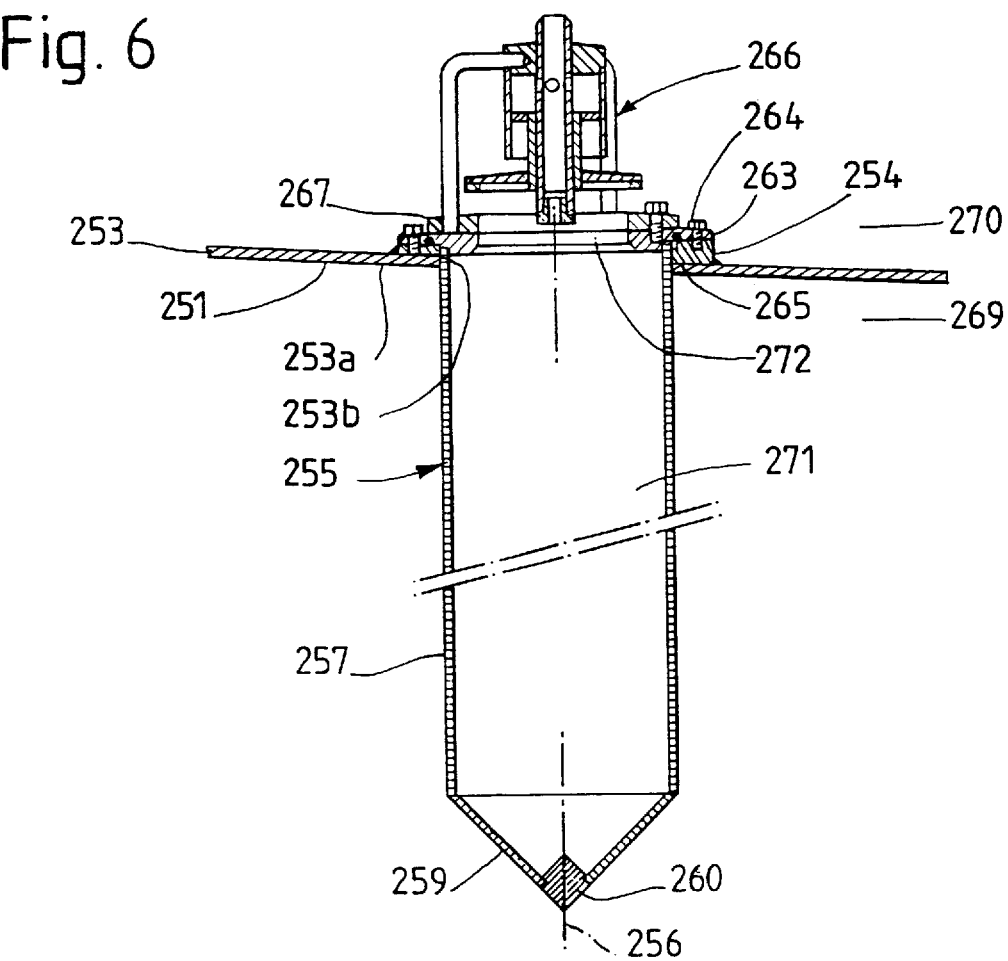

APPARATUS FOR REMOVING DUST FROM GAS AND FOR CLEANING AT LEAST ONE FILTER OF THE APPARATUS

BACKGROUND OF THE INVENTION

1. Field of the Invention

The invention relates to an apparatus for removing dust from gas, in particular from gas passed through a particulate material.

The terms "crude gas space" and "clean gas space" used below are first explained here. The crude gas space is understood as meaning a space which is adjacent to at least one filter and contains the gas to be filtered and to be freed from dust and from which the latter flows into the filter. A clean gas space is then understood as meaning a space which is adjacent to the or at least one filter and which the gas enters after flowing through the filter or the filters.

The apparatus has at least one container enclosing a crude gas space and at least one filter projecting into the crude gas space. The apparatus may have, for example, a material container and may be formed for passing gas through the crude gas space and through a particulate material present therein and for moving and treating the material, it being possible, for example, for the material to be fluidized with the gas and/or to be moved by a rotor which bounds the crude gas space at the bottom and has a disk. The means may serve, for example, for moving and treating a particulate material which is intended for the formation of a drug containing at least one pharmaceutical active ingredient, i.e. at least one active ingredient having a biological effect. The or at least one active ingredient may be contained, for example, in the particulate material introduced in the solid, dry or moist state into the material container. However, it is also possible to spray the particulate material in the material container with a liquid which may contain a dissolved or dispersed active ingredient. In addition to the material container or instead of it, the apparatus may have a downstream dust remover and/or another filtration device with a container which, when used, does not itself contain a particulate material but to which gas to be freed from dust is fed from another material container containing a particulate material. The apparatus may furthermore be formed as a spray dryer.

2. Description of the Prior Art

A fluidized-bed apparatus disclosed in U.S. Pat. No. 4,645,520 has a container which contains a fluidizing and crude gas space bounded at the top by an inner wall part. Filters projecting into the crude gas space are fastened to the inner wall part. Each filter has a casing with a cylindrical support member having gas passages, a filtration member arranged on the outside of said support member and supported by said support member, and bands serving for fastening said filtration member to the support member. The filtration member is formed by a flexible hose which has folds and comprises paper or a textile fabric. Each filter bounds a filter interior which is connected to a clean gas space present above the inner wall part by a passage passing through the inner wall part. A cleaning gas inlet which projects from the clean gas space through the passage into the filter interior, almost as far as the lower end of the filter, and has an inflatable bellows for closing the passage if required is present for each filter.

This known apparatus has the disadvantage that the filtration members consisting of paper or of a textile fabric have only low strength and a short service life and furthermore are not resistant to high temperatures. There is in particular a considerable danger that the filtration members will be damaged when the filter is blown out. The cleaning gas must therefore exert only a relative low pressure on the filtration members. However, a low cleaning gas pressure permits only port cleaning of the filtration members. In addition, the folds in the filtration members makes them more difficult to clean. The known apparatus furthermore has no devices for washing the filters inside the container. It would also be virtually impossible to wash the filters of the known apparatus clean inside the container by spraying with cleaning liquid under pressure, because this would even further shorten the service life of the filtration member. The filters must therefore each be removed from the container for washing, which is very time-consuming and may contaminate the environment and the operator.

If a bellows of the apparatus disclosed in U.S. Pat. No. 4,645,520 is to close a passage completely, it must be inflated and deformed to a very great extent. The bellows therefore probably closes the passage in practice only poorly, so that a considerable part of the cleaning gas flowing into the filter interior flows through the passage into the clean gas space during cleaning of a filter and does not contribute toward cleaning of the filter. The bellows are subjected to considerable stress during inflation and subsequent contraction and suffer considerable wear and must therefore probably be replaced after only a relatively short operating time. Furthermore, the bellows presumably consisting of natural and/or synthetic rubber are scarcely resistant to high temperatures and are brittle at low temperatures. In addition, the filtration members and bellows formed according to U.S. Pat. No. 4,645,520 are not sufficiently pressure-, heat- and fire-resistant to withstand any dust and/or solvent explosion which may take place in the crude gas space, so that they will be destroyed by such an explosion and will allow the explosion to spread through the filter.

Other known fluidized-bed apparatuses and other apparatuses for removing dust from gas likewise have filters with filtration members which consist of flexible hoses comprising paper or a textile material and generally have axial or circular or helical folds. These filters have disadvantages substantially similar to those of the filters described above and disclosed in U.S. Pat. No. 4,645,520.

SUMMARY OF THE INVENTION

It is the object of the invention to provide an apparatus for removing dust from gas, by means of which disadvantages of the known apparatuses can be avoided and in which in particular the or each filter is stable, has a long service life, is resistant to high and low temperatures and can be readily cleaned inside the container.

This object is achieved, according to the invention, by an apparatus for removing dust from gas, having a container bounding a crude gas space, at least one filter projecting into the crude gas space and gas conduction members for passing the gas from the crude gas space through the filter or filters, the or each filter having a casing with a metallic support member having gas passages and a filtration member enclosing said support member, supported by said support member and having an inner surface, an outer surface adjacent to the crude gas space and gas passages, and the gas passages of the filtration member having smaller internal diameters than the gas passages of the support member, wherein the filtration member is metallic, rests essentially with its entire inner surface against the support member and is supported by the latter in a dimensionally stable manner.

The invention furthermore relates to a process for cleaning at least one filter of an apparatus for removing dust from gas, in particular from gas passed through a particulate material serving, for example, for the formation of a drug, having at least one container enclosing a crude gas space, a wall part adjacent to the crude gas space holding at least one filter projecting into the crude gas space and at least one spray member in order to spray a liquid against an outer surface of the or at least one filter, wherein the wall part has, for the or each spray member held by it, a hole having a mouth opening into the crude gas space and wherein the spray member is displaceable from a rest position, in which it is present essentially on that side of the mouth of the hole which faces away from the crude gas space, into the crude gas space, and wherein cleaning gas is passed into a filter interior present in the filter and/or cleaning liquid is sprayed against the outer surface of the filtration member of the filter.

BRIEF DESCRIPTION OF THE DRAWINGS

The subject of the invention is now described in detail with reference to embodiments shown in the drawings. In the drawings, FIG. 1 shows a simplified vertical section through a material container and a downstream dust remover container of a fluidized-bed apparatus for treating a particulate material, FIG. 2 shows a simplified horizontal section through the material container, along the line II—II of FIG. 1, FIG. 5 shows a schematic axial section through a part of the casing of a filter on an even larger scale than in FIGS. 3 and 4 and FIG. 6 shows an axial section through a variant of a filter.

DESCRIPTION OF THE PREFERRED EMBODIMENTS

Figure 3:
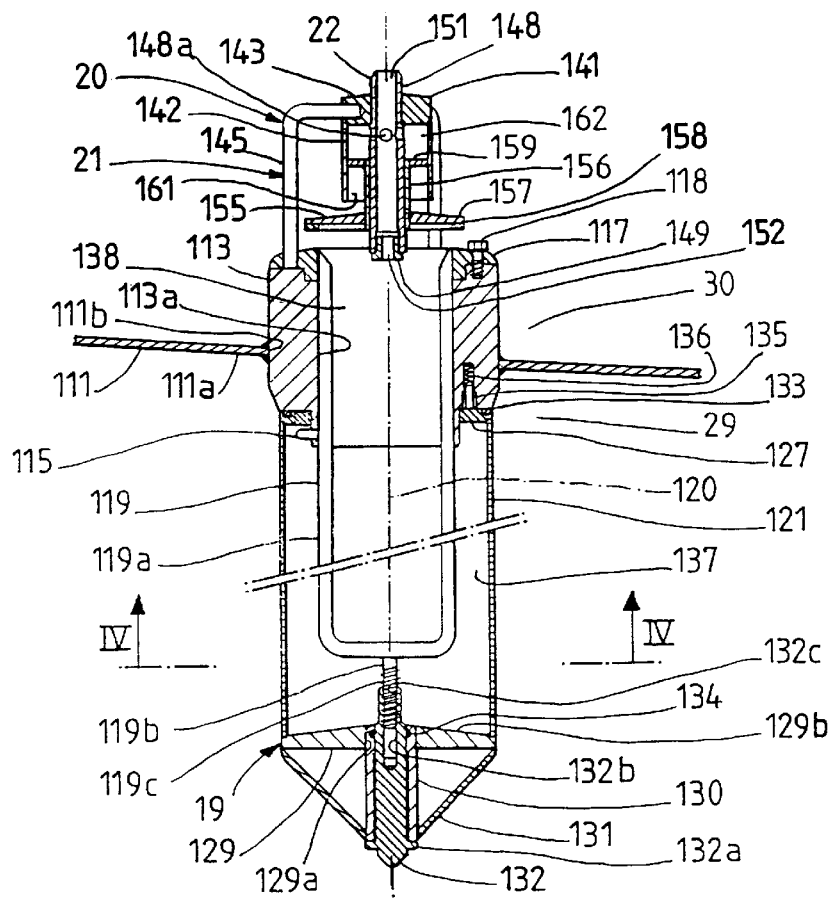
FIG. 3 shows an axial section through a filter arranged in the material container and the closure device coordinated therewith, on a larger scale than in FIGS. 1 and 2.

The fluidized-bed apparatus 1 shown in FIG. 1 has a material and fluidized bed container 3 which is generally rotationally symmetrical with respect to a vertical container axis 4. The container 3 has a wall 5. This is held on a frame, which is not shown, and has a plurality of detachable wall parts tightly connected to one another, for example, from bottom to top, a bottom wall part 6, a lower conical wall part 7, an upper conical wall part 8, a cylindrical wall part 9 and a top wall part 10. A perforated bottom 13 is arranged at the upper end of the bottom wall part 6 in the container and is mounted on bearing and pivot members 14 so that it is pivotable about a horizontal axis of rotation and capable of being fixed in different pivotal positions. The material container 3 furthermore has an inner container part or inner wall part 17 which is arranged in the upper half of the cylindrical wall part 9, is firmly and tightly connected thereto and serves as a partition.

The inner wall part 17 holds at least one filter 19 and namely a plurality of filters 19, for example four filters being distributed around the container axis 4 according to FIG. 2 in the material and fluidized-bed container 3 and being a distance apart from one another. Each filter 19 is detachably fastened to the inner wall part 17 and projects away from this in a downward direction. A gas cleaning device 20 shown only schematically in FIG. 1 and having a closure device 21 and a cleaning gas inlet 22 is fastened to wall part 17, for each filter 19. The inner wall part 17 furthermore holds wet cleaning means for wet-cleaning of the filters 19. The wet cleaning means have at least one wet cleaning device or wash device and namely four first wet cleaning devices 23 and a second, larger wet cleaning device 25.

The wall parts 6, 7, 8, 9, 10 together form the outer wall of the wall 5 and tightly seal an interior 27 from the environment. The perforated base 13, the inner wall part 17 serving as a partition and the filters 19 fastened thereto and devices 21, 23, 26 divide the interior 27 into three parts, namely, from bottom to top, into a gas distribution space 28, a fluidizing and crude gas space 29 and a clean gas space 30.

Each wet cleaning device 23, 25 has a housing, present essentially above the inner wall part 17 in the container 3, and a spray member. Each of these housings bounds a housing interior tightly sealed off from the clean gas space 30. The spray member of each wet cleaning device 23, 25 is adjustable and vertically displaceable in the coordinated housing and can be brought alternatively into a rest position and into a cleaning position. In the rest position, the spray members are essentially inside the coordinated housing and are then approximately or exactly flush with the lower surface of the inner wall part 17. In the cleaning position, the spray members are at least partly in the fluidizing and crude gas space 29. The spray nozzles or outlet openings of the spray members are then, for example, approximately at the height of the upper end sections of the filters 19.

The bottom wall part 6 is provided with a gas inlet 33 and a closable material outlet 34. Furthermore, a spray device 43 having at least one spray member 44 arranged in the fluidizing and crude gas space 29 and with at least one nozzle for spraying a binder or coating material may be present. The cylindrical wall part 9 is provided, at a circumferential point of the upper surface of the inner wall part 17, with a liquid outlet 48 which can be closed and opened alternatively and, above the inner wall part 17, with a gas outlet 49.

The apparatus 1 has a downstream dust remover 51 with a downstream dust remover container 53. Its wall 55 is in general rotationally symmetrical with respect to a vertical container axis 54 and has a plurality of wall parts detachably connected to one another, namely an essentially conical bottom wall part 56 tapering downward, a cylindrical wall part 57 and a top wall part 58. An inner container part or inner wall part 61 which forms a partition is fastened in the downstream dust remover container 53. Filters 63 are detachably fastened to the inner wall part 61, a gas cleaning device 64 with a closure device 65 and a cleaning gas inlet 66 being coordinated with each of said filters. Furthermore, first wet cleaning devices or wash devices 67 and a second wet cleaning device or wash device 68 are detachably fastened to the inner wall part 61.

The wall parts 56, 57, 58 together form the outer wall of the wall 55 and tightly seal an interior 69 from the environment. The inner wall part 61 serving as a partition and the filters 63 fastened thereto and devices 64, 67, 68 divide the interior 69 into a crude gas space 70 and a clean gas space 71, the crude gas space 70 being located below the inner wall part 61, and the clean gas space 71 above said wall part. The container 53 has a gas inlet 73 opening into the crude gas space 70, an alternatively closable and openable outlet 74 arranged at the lower end of the bottom part 56, a gas outlet 75 leading out of the clean gas space 71, and an alternatively openable and closable liquid outlet 78 arranged at a circumferential point of the upper surface of the inner wall part 61.

The walls 5 and 55 of the two containers 3 and 53, respectively, consist essentially—i.e. apart from seals present between the various wall parts, and the windows and the like—of metallic materials, namely of stainless steel. Each window has, for example, at least one glass pane.

The fluidized-bed apparatus 1 also has gas conduction means 81 for passing a process gas, namely air, from bottom to top through the two containers 3, 53. The gas conduction means 81 have an air inlet 83 open to the environment of the containers 3, 53. Said air inlet is connected to the gas inlet 33 of the material and fluidized-bed container 3 via a gas line 84, a shut-off and/or control device 85, a dust filter 86 and a gas processing device 87. The gas processing device 87 has, for example, a heating and/or cooling device and/or a dehumidifying device. The gas outlet 49 of the material and fluidized-bed container 3 is connected via a gas line 89 to the gas inlet 73 of the downstream dust remover container 53. The gas outlet 75 of the latter is connected via a gas line 91 and a suction device 92 to an air outlet 93 opening into the environment.

The apparatus 1 has cleaning gas feed means 95 which are shown only schematically and possess at least one compressed gas source which has, for example, a filter, a compressor and a compressed air container. The cleaning gas feed means 95 furthermore have shut-off devices connected to the or each compressed gas source, for example electric or pneumatic valves which are arranged close to the container 3 and whose outlets are connected to the cleaning gas inlets 22 and 66 by gas lines which are merely indicated by dashed arrows. For example, each cleaning gas inlet 22 or 66 coordinated with a filter 19 or 63, respectively, is connected to a valve by a separate gas line so that cleaning gas consisting of compressed air can be fed separately to each filter. However, it would also be possible to connect two or more cleaning gas inlets 22 and 66 to a common valve by a common gas line.

The apparatus furthermore has cleaning liquid feed means 96 which are shown only schematically. These have, for example, at least one pump, at least one liquid reservoir and shut-off devices, for example electric or pneumatic valves. These are connected by liquid lines, which are indicated by dashed arrows, to the wet cleaning devices 23, 25, 67 and 68 arranged in the two containers 3 and 53.

Figure 4:
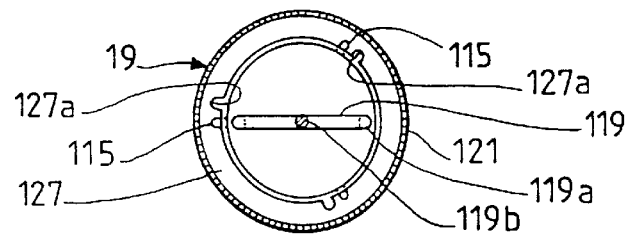
FIG. 4 shows a section through the filter, along the line IV—IV of FIG. 3.
Figure 5:
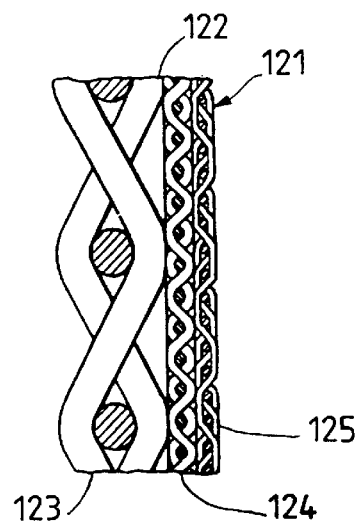

The formation of one of the filters 19 is described below with reference to FIGS. 3 to 5. The inner wall part 17 comprises a plate 111 having a lower surface 111a and, for each filter, a hole 111b. A sleeve-like support 113 which passes through a hole 111b in the plate 111 and is connected firmly and tightly, namely welded, to said plate is present for each filter 19. The support 113 has a vertical, essentially cylindrical hole 113a and, at its end located below the plate 111, a radial, flat annular surface and a collar which projects away downward from said annular surface and to which a few pins 115 projecting radially outward are fastened. An annular flange 117 is detachably fastened by means of a few screws 118 to that end of the support 113 which is located above the plate 111. A holder 119 has an upper part 119a with two or more vertical limbs and a connecting member, which connects their lower ends to one another and has a web or a plurality of radial arms, and a shaft 119b projecting vertically downward away from said connecting member and having an external thread 119c.

Each filter 19 is essentially rotationally symmetrical with respect to a vertical filter axis 120 which is parallel to the container axis 4 and is also the axis of the hole 111b and of the support 113. Each filter 19 is formed as an essentially dimensionally stable cartridge filter and has a gas-permeable casing 121 which is coaxial with the filter axis and essentially rotationally symmetrical, namely essentially cylindrical. Said casing contains a hollow, metallic support member 122 which is shown in FIG. 5 and consists of at least one relatively coarse wire fabric and namely of an inner, coarser wire fabric 123 and an outer, finer wire fabric 124 formed from thinner wires. The casing 121 furthermore has a metallic filtration member 125 which encloses the support member 122, is adjacent to said support member, forms the outermost boundary of the casing 121 and consists of a wire fabric which is even finer than the outer wire fabric 124 of the support member 122 and is formed from even thinner wires. The gaps present between the meshes of the wire fabric form gas passages. The inner wire fabric 123 of the support member 122 consists, for example, of wires having a diameter of about 0.5 mm to 1 mm and has an interior mesh size the space between the wires, of for example, about 5 mm to 10 mm. The outer wire fabric 124 of the support member 122 consists, for example, of wires about 0.3 mm to 0.5 mm thick and has an interior mesh size of, for example, about 1 mm to 3 mm. The internal width or size of the gas passages of the support member is equal to the mesh size of the outer, finer wire fabric 124. The filtration member 125 is formed by a wire fabric whose wires have, for example, diameters of 0.01 mm to 0.5 mm and whose interior mesh size is, for example, 0.01 mm to 0.5 mm. The filtration member 125 is preferably formed in such a way that the finest gas passages are arranged at the outer surface of the filtration member so that, when the filter 19 is used, the dust is separated off, at least for the most part and virtually completely, at that outer surface of the filtration member which forms the outermost boundary of the casing 121. The three wire fabrics consist of stainless steel. The wires belonging to one and the same wire fabric and also the wires belonging to different wire fabrics are firmly and nondetachably connected to one another, namely sintered with one another, at the points of contact at which they intersect and touch one another.

The support member 122 and the filtration member 125 of the casing 121 are welded or possibly soldered to a metallic ring 127, namely consisting of stainless steel, at the upper end of said casing, along its entire circumference. Said ring is provided, for each pin 115, with a radial incision 127a penetrating it at its inner edge. The pins 115 and the incisions 127a together form fastening members similar to bayonet connection and are formed in such a way that, for fastening the filter 19 to the container or wall part 17, the ring 127 can be moved vertically upward in such a way that each pin 115 passes through an incision 127a. Thereafter, the filter can be rotated slightly about its vertical axis so that the pins engage the lower end surface of the ring 127 and temporarily hold the filter loosely and with axial play on the support 113.

At its lower end facing away from the ring 127, and along its entire circumference, the casing 121 is welded or possibly soldered to a metallic disk 129, for example consisting of stainless steel. The disk 129 has, in its center, a through-hole 129a coaxial with the filter axis 120 and, at the upper end, a surface 129b inclined slightly conically downward away from the filter axis 120 and from the hole 129a. A sleeve 130 coaxial with the filter axis 120 fits with its upper end in the hole 129a of the disk 129, is welded or possibly soldered to said disk, projects away from it downward and has a continuous axial hole. A compact, i.e. hole-free, metallic end wall 131 tapering conically downward is welded or soldered at its upper edge to the disk 129 and at its lower edge to the sleeve 130. An elongated fastening member 132 has a cylindrical section passing through the sleeve 130, a slightly thinner, cylindrical end section above the disk 129 and, at the lower end projecting from the sleeve 130 and from the actual filter, a collar 132a adjacent to the radial end surface of the sleeve and a head having surfaces which are not rotationally symmetrical and are intended for engaging a key or another tool. The fastening member 132 has an axial blind hole 132b which opens into the upper end surface of said fastening member and has an internal thread 132c which is screwed to the external thread 119c of the holder 119. The holder 119 and the fastening member 132 together form fastening members, detachably connect the filter 19 through the hole 129a in the disk 129 to the support 113 and press the ring 127 of the filter 19 against a radial, flat annular surface of the support 113. The support 113 and the ring 127 are sealed against one another by a seal 133, for example held in an annular groove of said ring. Furthermore, the fastening member 132 is sealed against the sleeve 130 by a seal 134 held in an annular groove in the sleeve 130. A metallic, electrically conductive contact pin 135 displaceably guided in an axial blind hole of the support 113 is pressed against the ring 127 by a spring 136 arranged in the same blind hole and provides an electrically conductive connection between the filter and the wall part 17 and via this to earth. The casing 121, the ring 127 and the disk 129 together bound a hollow filter interior 127 of the filter 19. That inner surface of the support member 124 of the casing 121 which encloses the filter interior 137 is a distance away from the holder 119 everywhere.

The support member 122 is stable in shape. The filtration member 125 by itself may be rather flexible. However, since it is essentially rotationally symmetrical with the filter axis, namely cylindrical, and free of folds and waves, rests essentially over its entire inner surface against the outer surface of the support member and in addition is sintered with this at all points of contact, the filtration member is supported by the support member so that the filtration member too and hence the entire casing is essentially stable in shape and dimensionally stable. The outer surface and the inner surface of the support member and also that outer surface of the entire casing which is formed by the outer surface of the filtration member 125 are essentially cylindrical and are circular in cross-section—i.e. apart from the wires bent around one another. Because the filtration member 121 rests essentially with its entire inner surface and in particular at both ends along its entire circumference against the support member 122, because the support member 122 rests at its ends along its entire circumference against the ring 127 or against the disk 129 and because the support member and the filtration member are welded or soldered to the ring 127 or the disk 129 along the entire circumference, a stable and durable connection of the support member and of the filtration member with the ring 127 and the disk 129 results. The axial hole 113a of the support 113 and the axial hole flush with this and present in the annular flange 117 together form a first passage 138 which connects the filter interior 137 through the inner wall part 17 to the clean gas space 30 and can be alternatively closed and opened by means of the closure device 21 coordinated with the relevant filter 19.

The gas cleaning device 20 coordinated with the filter shown in FIG. 3 and the closure device 21 of said cleaning device are likewise shown in FIG. 3 and have a sleeve 141 coaxial with the filter axis 120. Said sleeve has a cylindrical casing 142 and a disk-like end element 143 which is connected firmly and tightly to the casing 142 at the upper end of said casing, which end faces away from the filter 19. The casing 142 and the end element 143 consist, for example, of separate, metallic parts welded to one another. Three L-shaped retaining rods distributed around the filter axis have horizontal limbs fastened to the end element 143 and vertical limbs fastened to the annular flange 117. The annular flange 117 thus serves for fastening both the filter 19 and the gas cleaning device 20. The lower end of the casing 142 is open and is a distance away from the annular flange 117.

The cleaning gas inlet 22 of the gas cleaning device 20 shown in FIG. 3 is coaxial with the filter axis 120, is connected to a line (not shown) of the cleaning gas feed members 95 and has, as the main component, a short pipe 148 which passes through the sleeve 141 and projects therefrom at the top and bottom and whose lower end projects into the central hole of the annular flange 117. The pipe 148 has a stepped outer surface with two cylindrical sections and a locating surface adjacent to the lower, radial surface of the end 143, passes through a hole in the end element 143 and is tightly fastened, for example welded, to the latter. The external diameter of that section of pipe which projects into the annular flange 117 is substantially smaller than the internal diameter of the annular flange 117. That end section of the cleaning gas inlet 22 which projects into the first passage 138 is therefore enclosed by an annular free region of the first passage. The pipe has an axial cylindrical passage and, below the end member 143 and close to it, at least one radial hole 148a and preferably a plurality of holes 148a distributed along the circumference of the pipe. The lower end section of the axial passage of the pipe 148 is provided with an internal thread into which a sleeve-like choke 149 with an axial passage is detachably screwed. The axial passages of the pipe 148 and of the choke 149 of the cleaning gas inlet 22 together form a second axial passage 151. The passage 151 has a constriction 152 which is formed by the passage of the choke 149 and which is located between the holes 148a and that end of the second passage 151 which opens into the first passage 138.

A closure member 155 has a hollow rod 156, enclosing the pipe 148 and is preferably guided by said pipe, and a disk 157 fastened to the lower end of said rod and made of, for example, metal. An annular, elastically deformable seal 158 is fastened to the lower surface of the disk 157, close to the edge thereof. The diameters of the disk 157 and of the seal 158 are slightly greater than the diameter of the central hole of the annular flange 117. In the operating position of the closure member 155, shown in FIG. 6, the disk 157 and the seal 158 are a distance away from the annular flange 117. The closure member 115 can be displaced, in a manner which will be described in detail, into a closed position in which the disk 157 or—more precisely—the seal 158 fastened thereto rests against an annular surface of the annular flange 117, which surface is present at the upper end of said flange. The annular flange 117 thus also forms a valve seat. A piston 159 consisting of an annular, metallic disk is fastened, for example welded, tightly to the upper end of the hollow rod 156. The annular piston 159 is located in the interior 161 of the sleeve 141, which interior is present between the casing 142 and the pipe 148 and is annular in cross-section. The interior 161 has an interior region 162 which is present between the closure element 143 and the piston 159 and into which the holes 148a open. The piston 159 and the hollow rod 156 have at most a small radial play on the pipe 148 and in the casing 142, respectively. Preferably, a very narrow, for example at most or approximately 1 mm wide annular gap is present between the inner surface of the casing 142 and the piston 159. The piston 159 and the hollow rod 156 are readily displaceable and seal the interior region 162 not completely but more or less (tightly) from the free region of the cleaning space 30. If necessary, it would also be possible to provide seals for sealing the piston 159 and the hollow rod 156 against the casing 142 and the pipe 148, respectively.

The filters 63, gas cleaning devices 64 and wet cleaning devices 67, 68 of the downstream dust remover 51 are formed, for example, identically or similarly to the filters 19 or gas cleaning devices 20 or wet cleaning devices 23, 25 arranged in the material container 3.

The metallic casing 121 and the other metallic parts of each filter and of each gas cleaning device are heat-resistant to high temperatures and of course remain tough and cold-resistant even at low temperatures. The seals 133, 134, 158 and any other seals present are likewise formed in such a way that they, and hence all the filters and all the gas cleaning devices, are heat-resistant up to temperatures of at least 200° C. and are still resilient, cold-resistant and usable even at temperatures below 0° C.

The inner wall parts 17 and 61 are shown flat and horizontal in FIG. 1 for the sake of simplicity. However, the inner wall parts 17, 61 and their upper surfaces bordering the clean gas spaces 30, 71 are in reality not exactly flat and horizontal but—as in the case of those upper surfaces of the parts of the gas cleaning devices 20, 64 which border the clean gas spaces, and the closure devices 21, 65 belonging to said devices, and the wet cleaning devices 23, 25, 67, 68—at least slightly inclined relative to the horizontal planes, for example flat and inclined at least in parts and/or conical and/or arched, essentially in such a way that any cleaning liquid which may reach the stated, upper surfaces during wet cleaning rapidly flows away to the liquid outlets and can be discharged through these. The inner wall parts 17 and 61 are, for example, slightly arched upward toward the middle, at least in parts, and furthermore in general slightly inclined so that the planes defined by the edges of the inner wall parts make an angle of inclination of, for example, about 2° or possibly up to about 5° with horizontal planes and the lowest points of the upper surfaces of the inner wall parts 17, 61 are located at the liquid outlet 48 or 78. The plate 111 forming the main component of the inner wall part 17 and the corresponding plate of the inner wall part 61 are accordingly likewise slightly arched at least in places and in general slightly inclined, as indicated for that section of the plate 111 which is shown in FIG. 3. The shapes and angles of inclination of the plate sections supporting a filter may differ in the case of the various filters. The upper surfaces of those parts 117, 143, 155 of the closure device 21 of the gas cleaning device 20 which are shown in FIG. 3 are, for example, conical and inclined outward and downward at angles of inclination of about or at least 2° relative to horizontal planes. The filter axes of the filters 19, 63 are nevertheless all vertical and parallel to the container axes 4 and 54, respectively. The axes of the wet cleaning devices 23, 25, 66, 68 are approximately or exactly perpendicular to a flat surface which makes tangential contact with that section of an inner wall part which supports the respective wet cleaning device.

The operation of the fluidized-bed apparatus 1 will now be described. At the start of operation, a batch of the particulate material 99 serving, for example, for the formation of a drug is introduced into the fluidizing and crude gas space 29, for example through a closable material inlet which is not shown.

During the "normal" operation, described first below, of the apparatus for the treatment of the particulate material 99, process gas consisting of filtered and treated air is passed, by means of the gas conduction means 81, from bottom to top through the material and fluidized-bed container 3 and the downstream dust remover container 53. The particulate material 99 is thus fluidized and treated. For example, a liquid is first sprayed onto the particles of the material by the spray device 44 in order to agglomerate said particles to give larger particles and/or to provide the particles with coatings. The material 99 is then further fluidized and dried without spraying However, the material can also be merely dried without prior spraying.

During normal operation of a filter, no cleaning gas is fed to the latter. The closure member 155 of the closure device 21 is then raised by the air sucked through the container 3 by the suction device 93 and reaches the open position shown in FIG. 3. During normal operation of filters, the air in the material container 3 flows out of the crude gas space 29 through the casings 121 of the filters 19 into the filter interiors 137 and from these through the passages 138 into the clean gas space 30 common to all filters 19. In the downstream dust remover 51, the air flows analogously from the crude gas space 70 through the casings of the filters 63 into the filter interiors present therein and from these into the clean gas space 71.

The air forming the process gas and flowing from the fluidized bed upward to the filters 19 usually contains dust, for example abraded material of the particulate material and possible also particles of solids which were dissolved or dispersed in the sprayed liquid. During normal operation of the filters 19, the air is filtered through their casings 121 wherein dust is deposited on the outer surfaces of the filtration members 125 present on the outside of the casings 121. The process gas entering the downstream dust remover 51 may likewise contain a little fine dust, which is then separated off by the filters 63 of the downstream dust remover.

The dust separated from the air by the filters 19 and 63 and adhering to the outer surfaces of the casings 121 of the filters reduces the permeability of the filters. Each filter 19, 63 is therefore cleaned with cleaning gas from time to time during the fluidization of the material 99. Said cleaning gas consists, for example, of air which was sucked in from the environment, filtered, and compressed by the compressor of the feed means 95 so that the pressure is greater—preferably at least 100 kPa and for example 200 kPa to 1000 kPa greater—than the ambient air pressure and than the pressure in the crude gas spaces 29 and 70, which is usually slightly less than the ambient air pressure. When the cleaning gas feed means 95 deliver compressed air serving as cleaning gas, for example to the cleaning gas inlet 22 shown in FIG. 3, a part, and for example the major part of said compressed air flows through the passage 151 of the cleaning gas inlet 22 into the passage 138 bounded by the support 113 and annular flange 117. Since the closure member 155 is still in the open position at the beginning of the delivery of compressed air, the air flowing through the inlet 22 into the passage 138 flows partly into the clean gas space 30 and partly into the filter interior 137. When compressed air flows through the passage 151 of the cleaning gas inlet into the passage 138, a pressure gradient forms in the passage 151 and in particular in its constriction 152. Consequently, compressed air also flows through the holes 148a of the inlet into the interior region 162 of the sleeve 141. The pressure in the interior region 162 thus becomes so much greater than the pressure in the remaining part of the interior 161 of the sleeve 141 which is connected to the clean gas space 30 that the annular piston 159 is displaced downward and displaces the closure member 155 into the closed position and presses it against the support surface formed by the annular flange 117. The piston now holds the closure member 155 in the closed position as long as compressed air is delivered to the cleaning gas inlet 22. Apart from any small leakage loss in the piston 159 and closure member 155, this compressed air then flows through the passages 151, 138 into the filter interior 137 and through the gas-permeable casing 121 of the filter 19 into the crude gas space 29. During this procedure, the compressed air serving as cleaning gas blows virtually all the dust adhering to the outside of the casing 121 of the filter 19 away from the filter 19 into the fluidizing and crude gas space 29. Since the closure member 155 closes the passage 138 during this cleaning operation and since the pressure of the compressed air serving as cleaning gas is greater than that of the air sucked as process gas through the fluidizing and crude gas space, no or at least virtually no process gas flows out of the crude gas space into the filter during the delivery of cleaning gas to a filter. The dust blown away from the filter can therefore at least partly fall into the fluidized bed and—at least when the particles of the material 99 are still moist—adhere to said particles. Those filters 19 which are not supplied with compressed air serving as cleaning gas filter process gas during the cleaning of a filter.

When the delivery of cleaning gas to a filter ceases, the closure member 155 is then raised again from the annular flange 117 due to the suction effect of the suction device and is displaced into the open position. When no compressed air is delivered to the cleaning gas inlet 22 of a filter, the closure device 22 coordinated with the relevant filter thus behaves in the same way as a nonreturn valve.

The cleaning gas feed means 95 generate a sequence of cleaning gas pulses for cleaning filters and, for example, deliver a cleaning gas pulse alternately to each of the various filters 19 on a cyclic basis. This takes place essentially during the entire time for which process gas is passed through the containers 3 and 53. In this way, all filters 19 are blown out individually and alternately on a cyclic basis. Instead of this, a cleaning gas pulse may be delivered simultaneously to a group of filters 19. However, cleaning gas should never be delivered simultaneously to all filters 19 or all filters 63 so that other filters 19 or 63 are still available for filtering process gas while filters 19 or 63 are being blown out. The feed means 95 preferably have adjusting members with which the lengths or durations of the individual pulses are adjustable from about 0.5 s to about 5 s and the time intervals between successive pulses are adjustable from about 0.5 s to 10 s or up to 100 s.

The filters 63 of the downstream dust remover 51 can be cleaned with cleaning gas in an analogous manner, individually and alternately or in groups. Since the air flowing through the downstream dust remover contains only a little dust, the filters of the downstream dust remover usually have to be cleaned less frequently than the filters present in the material container. The dust blown away from the filters 63 can then be collected in the bottom part 56 of the downstream dust remover and can be discharged from the downstream dust remover container 53 from time to time through the outlet 74.

In the production of fluidized-bed apparatuses, it is possible to produce chokes 149 which form constrictions 152 having different internal diameters. Since the chokes 149 are detachably screwed into the pipes 148, they can be easily and rapidly changed. Consequently, the pressure gradient generated by a choke 149 or constriction 152 during the delivery of compressed air to a cleaning gas inlet 22 can be easily adapted to the intended dimensions of the apparatus and to the intended operating parameters and, if necessary, subsequently changed.

When the treatment of a batch of the particulate material 99 is complete, the suction device 92 is switched off, the transport of process gas is terminated and the material 99 is removed from the fluidized-bed container 3.

After the end of normal operation and after emptying of the material container 3, the filters 19, 63 and other parts can be subjected to wet cleaning or can be washed. The cleaning liquid feed means 96 can deliver alternatively to different wet cleaning devices 23, 25, 67, 68 a cleaning liquid whose pressure is, for example, 200 kPa to 600 kPa and whose temperature is more than 0° C. and, for example, 20° C. to 100° C. or possibly up to 150° C. If the feed means 96 of at least one of the wet cleaning devices 23, 25 temporarily deliver a cleaning liquid under pressure, the spray member of the or each relevant cleaning device is displaced into the crude gas space 29 and sprays cleaning liquid. Some of the latter strikes the casings 121 of filters 19 which are located close to the relevant wet cleaning device. During spraying of the filters, cleaning gas, i.e. compressed air, is delivered to said filters in pulses by the cleaning gas feed members 95 alternately on a cyclic basis via the gas cleaning devices 20, 64, so that the filters are intermittently blown out. When the spraying of the filters is complete, the filters are likewise blown out with cleaning gas intermittently or continuously for a certain period.

The filters 63 of the downstream dust remover 51 can be subjected to wet cleaning in a manner analogous to that for the filters in the fluidized-bed container.

The filters 19, 63 and in particular their metallic casings are stable, resistant to high and low temperatures and durable. The filters therefore have a much longer service life than known filters having filtration members made of paper or textile materials. The stable design of the casings furthermore makes it possible to deliver the cleaning gas and the cleaning liquid during the cleaning operations at relatively high pressures which help to achieve good cleaning, without the filters being damaged by the cleaning gas or cleaning liquid.

Since the casings 121 of the filters 19 and 63 have cylindrical outer surfaces formed by the filtration members 125, circular in cross-section and having no waves or folds, and are formed in such a way that the dust is deposited on the outer surfaces of the casings of the filters during normal operation of the fluidized-bed apparatus, the filters can be thoroughly cleaned everywhere both during dry cleaning with cleaning gas and during cleaning with a cleaning liquid. Since the wires of the various wire fabrics of the casing 121 of a filter are sintered together at the points of intersection, no dust can enter between intersecting wires. In the cleaning of the filters, this likewise helps to make thorough cleaning possible.

Because the filters can be thoroughly cleaned and are durable, they need be removed only seldom for cleaning or inspection or repair. This is advantageous in particular in the processing of toxic or other substances which are hazardous to health, because the danger of contamination of the environment and of the operator which is associated with removal of the filters is virtually completely avoided. Furthermore, the cleaning of the filters can be substantially automated, helping to achieve constant purity and quality of the products produced and economical operation of the apparatus.

Since the casings of the filters and in particular their filtration member consist of a metallic material and since the casings have a very stable design, in particular the filtration member 125 consisting of a very thin wire fabric resting essentially with its entire inner surface against the support element 122 and being connected thereto, it is also possible, during operation of the apparatus, substantially to ensure that the filtration member remains substantially intact in the case of any explosion in the crude gas space and that the explosion does not penetrate into the clean gas space.

The described detachable fastening of the filters permits rapid and easy installation of these during assembly of a fluidized-bed apparatus 1. If necessary, a filter can also be subsequently removed temporarily in a short time from the container 3 or 53 and cleaned and/or inspected or changed, if this in fact is necessary in rare cases in spite of the good cleanability and long service life of the filters. During installation and removal of a filter, it is particularly advantageous that only a single fastening member 132 is required for fastening a filter and that said member is located at the lower end of the filter in the installed filter and is therefore readily accessible from the crude gas space and from below.

FIG. 6 shows an inner container or wall part 251 which forms the partition of a fluidized-bed container or downstream dust remover container and has a plate 253. This has a surface 253a at the bottom and at least one cylindrical through-hole 253b. The wall part 251 is if necessary provided, at each hole 253b, with a reinforcing ring 254 which rests on the upper surface of the plate 253 and is connected firmly and tightly, for example welded, to said plate and whose hole is flush with the hole 253b.

A filter 255 is fastened to the wall part 251 at the or each hole 253b. The filter 255 defines a vertical filter axis 256, is essentially rotationally symmetrical with said axis and has a cylindrical, gas-permeable casing 257 which is circular in cross-section, stable in shape and formed similarly to the casing 121 and has a support member and a filtration member. The filter has an end wall 259 which is connected, for example welded or possibly soldered, to the lower end of the casing 257 and tapers conically downward. Said end wall is gas-permeable, in contrast to the end wall 131 of the filters 19. The end wall 259 is formed analogously to the casing 257 and consists of a support member and a filtration member adjacent to the outer surface of said support member, the support member and the filtration member being circular in all cross-sectional planes. The support member of the end wall 258 consists of at least one wire fabric and preferably, as in the case of the support member 122, of an inner, coarser and an outer, finer wire fabric. The filtration member of the end wall 258 then consists of a wire fabric which is even finer than the inner wire fabric of the support member of the end wall 258. The filtration member accordingly has narrower gas passages than the support member. The wires of the various wire fabric are sintered with one another at the points of intersection, as in the casing 121. A gas-tight end member 260 which is firmly and tightly connected, for example welded or possibly soldered, to the end wall 259 is present at the lower, narrower end of the conical end wall 259. The filter 255 furthermore has a ring 263 with a section which projects from the upper side of the inner wall part 251 into that hole of the wall part 251 which is formed by the hole of the reinforcing ring 254 and by the hole 253b of the plate 253 and possibly through said hole and to which the upper end of the casing 257 is fastened, for example welded or possibly soldered, along the entire circumference of said casing. The ring 263 has a collar resting on the upper side of the reinforcing ring 254 and is detachably fastened to the container part or wall part 251 by fastening members distributed along the circumference of said collar, namely screws or threaded bolts 264 screwed into threaded holes of the reinforcing ring, and is sealed against said container part or wall part by means of a seal 265.

A gas cleaning device 266 shown in FIG. 6 is also present. This has an annular flange 267 detachably fastened to the ring 263 and hence to the wall part 251. The gas cleaning device 266 is otherwise formed similarly to the gas cleaning device 20.

The wall part 251 together with the surface 253a of the plate 253 defines a crude gas space 269 and separates this from the clean gas space 270 present above the wall part 251. The filter 255 encloses a filter interior 271. This is connected to the clean gas space 270 by a first passage 272 defined at least partly by the ring 263 and by the annular flange 267. The gas cleaning device 266 has a cleaning gas inlet with a second passage opening into the first passage 272 and a closure device, by means of which the passage 272 can be closed and opened.

While the filters 19 are mounted on the wall part 17 from the lower side of said wall part, the or each filter 255 is inserted into the hole in the wall part from the upper side of said wall part during assembly. When the filter 255 is used, process gas flows from the crude gas space 269 into the filter interior 271 both through the casing 257 and through the end wall 259. Otherwise, the filter 255 has properties similar to those of the filters 19 and 63 and is used similarly to these.

The number of filters and the number of wet cleaning devices used for cleaning the filters may be smaller or larger than in the arrangement shown in FIG. 2. However, a material container preferably contains at least two filters. On the other hand, a downstream dust remover container could contain only one filter.

The apparatus and its operation may also be modified in other respects. For example, features of the filters shown in FIGS. 3 and 6 and of the fastening members used for fastening them may be combined. Furthermore, the reinforcing ring 254 may be omitted from the inner container part or wall part 251 if the plate 253 is sufficiently thick.

Furthermore, the cleaning gas inlets could extend into the filter interiors. In addition, each closure device could have at least one spring to exert on the displaceable closure member 155 a force directed against the annular flange 117 or 267 or away from this.

Furthermore, instead of being fastened to an inner wall part present in the container, the filter or filters, the gas cleaning device coordinated with the or each filter and the wet cleaning devices could be fastened to a wall part belonging to the outer wall of the container, for example to the top wall part of the container. The or each gas cleaning device coordinated with a filter could then be covered with a cap which is attached to the upper side of the ceiling and also bounds a clean gas space coordinated with the (relevant) filter.

Furthermore, instead of air, another gas—for example nitrogen—could be used as process gas and/or as cleaning gas.

For further details of the invention, in particular of the wet cleaning devices, the formation and sealing of the perforated bottom and the formation of the windows, reference may be made to the U.S. patent applications Ser. Nos. 08/773,328 filed on Dec. 23, 1996, now U.S. Pat. No. 5,766,281, issued on Jun. 16, 1998, 08/773,327 filed on Dec. 23, 1996, now U.S. Pat. No. 5,809,705, issued on Sep. 22, 1998, and 08/722,725 filed on Dec. 23, 1996, now U.S. Pat. No. 5,766,557 issued on Jun. 16, 1998 simultaneously filed claiming the priorities of the Swiss Patent Applications 3706/95, 3708/95 and 3709/95 and hereby incorporated by reference.

What is claimed is:

1. An apparatus for removing dust from gas, having a container hounding a crude gas space, at least one filter projecting into the crude gas space and gas conduction means for passing the gas from the crude gas space through said filter, said filter having a casing with a metallic support member and a metallic filtration member enclosing said support member and supported by said support member, said support member having at least one wire fabric defining support member gas passages, said filtration member comprising a wire fabric and having an inner surface, an outer surface directly adjacent to the crude gas space and gas passages, the gas passages of the filtration member having smaller internal widths than the widths of the gas passages of the support member, wherein substantially the entire inner surface of said filtration member lies against the support member and is entirely supported by the support member in a dimensionally stable manner.

2. An apparatus as claimed in claim 1, wherein said filter defines a filter axis and wherein the support member and filtration member are essentially rotationally symmetrical with respect to the filter axis and wherein the filtration member is free of folds and waves.

3. An apparatus as claimed in claim 1, wherein the support member and filtration member are essentially cylindrical.

4. An apparatus as claimed in claim 1, wherein each of the wire fabrics of the support member and the filtration member include wires that are sintered with one another at points of contact, and wherein the wires of the support member wire fabrics are sintered with the wires of the filtration member wire fabric at points of contact.

5. An apparatus as claimed in claim 4, wherein all wire fabrics of the casing consist of stainless steel.

6. An apparatus as claimed in claim 4, wherein the support member wire fabric comprises an inner wire fabric and an outer wire fabric sintered together at points of contact and wherein said outer wire fabric has a smaller mesh size and is formed from thinner wires than the inner wire fabric.

7. An apparatus as claimed in claim 1, wherein said at least one filter is fastened to a wall part of the container and bounds a filter interior which is connected by a passage to a clean gas space present on that side of the wall part which faces away from the crude gas space, and wherein a cleaning gas inlet and a closure device are associated with each said filter for passing cleaning gas into the filter interior and for closing said passage during the feeding of cleaning gas to the filter interior.

8. An apparatus as claimed in claim 7, further comprising a sleeve enclosing the cleaning gas inlet about a cross-section of said cleaning gas inlet and including a piston displaceable in said sleeve, said piston connected to a closure member, wherein the sleeve is tightly sealed by an end element on that side of the piston which faces away from the filter and wherein the cleaning gas inlet is fixedly connected to said wall part, passes through the piston, the end element and the closure member, encloses a second passage connected to the filter interior and has at least one hole which connects the second passage to an interior region enclosed by the sleeve between the end element and the piston.

9. An apparatus as claimed in claim 8, wherein the second passage has a constriction between the at least one hole and an end located on that side of the piston which faces away from the at least one hole.

10. An apparatus as claimed in claim 9, wherein the cleaning gas inlet has a pipe with an internal thread into which a choke forming the constriction is detachably screwed.

11. An apparatus as claimed in claim 7 wherein said container includes a liquid outlet and means for opening and closing said liquid outlet, and at least one wet cleaning device for spraying a cleaning liquid against the outer surface of the filtration member, and wherein the wall part has a surface on an upper side of said wall part and adjacent to the clean gas space, and wherein each said closure device and each said wet cleaning device has at least one surface within the clean gas space and present on an upper portion of each said closure device and each said wet cleaning device that is inclined such that any cleaning liquid reaching said inclined surfaces flows to the liquid outlet and is discharged through the liquid outlet.

12. An apparatus as claimed in claim 1, wherein the at least one filter is detachably fastened to a wall part of the container.

13. An apparatus as claimed in claim 12, wherein said at least one filter is adjacent to a wall part surface facing the crude gas space, is removable from said wall part surface, and is fastened on the wall part by a fastening member being accessible at a filter end which faces away from the wall part.

14. An apparatus as claimed in claim 12, wherein said at least one filter has a ring at one end of said filter, wherein the support member and the filtration member are fixedly joined at one end, along their entire circumference, to the ring, and wherein the ring is adjacent to the wall part and removable therefrom.

15. An apparatus as claimed in claim 12, wherein the support member and the filtration member are welded or soldered at support member and filtration member ends facing away from the wall part, along the entire circumference of said support member and filtration member ends, to a disk which has a surface which faces the wall part and is inclined outward and away from said wall part.

16. An apparatus as claimed in claim 15, wherein the disk has a hole in the center and wherein the filter is detachably fastened to the wall part by fastening means passing through the hole in the disk.

17. An apparatus as claimed in claim 16, wherein the disk is welded or soldered to an end wall projecting away from said disk, and from the casing and tapering away from the disk and wherein the disk and the end wall are firmly connected to one another by a sleeve which is coaxial with the hole in the disk and has an axial through-hole.

18. An apparatus as claimed in claim 10, wherein the support member and the filtration member are welded or soldered, at support member and filtration member ends facing away from the wall part, to a gas-permeable end wall which tapers away from the wall part and has on the inside a support member with gas passages and on the outside a filtration member with gas passages, whose internal diameters are smaller than the internal diameters of the gas passages of the support member of the end wall.

19. An apparatus for removing dust from gas, having a container bounding a crude gas space, at least one filter projecting into the crude gas space and gas conduction means for passing the gas from the crude gas space through the at least one filter, the at least one filter having a casing with a metallic support member and a metallic filtration member enclosing said support member and supported by said support member, the support member having an inner wire fabric and an outer wire fabric, the filtration member comprising a wire fabric having an inner surface and an outer surface, said outer surface being directly adjacent to the crude gas space, each of said wire fabrics having wires defining gas passages with internal widths, the wires of the outer wire fabric being thinner than the wires of said inner wire fabric, and the wires of the filtration member being thinner than the wires of the outer wire fabric of the support member, the internal widths of said outer wire fabric of the support member being smaller than the internal widths of said inner wire fabric, and the internal widths of the filtration member being smaller than the internal widths of the outer wire fabric of the support member, wherein the adjacent wire fabrics rest on one another and wherein the wires belonging to the same wire fabric and also the wires belonging to different wire fabrics are sintered with one another at points of contact.

20. An apparatus as claimed in claim 19, wherein said at least one filter defines a filter axis, wherein the support member and filtration member are essentially rotationally symmetrical with respect to the filter axis, and wherein the filtration member is free of folds and waves.

21. An apparatus as claimed in claim 19, wherein all wire fabrics of the casing are of stainless steel.

22. An apparatus for removing dust from gas, having a container, an inner wall, a plurality of filters, and at least one wet cleaning device, the container bounding a container interior, the inner wall dividing said container interior into a crude gas space and a clean gas space, wherein each filter is fastened to the inner wall and projects into the crude gas space, each filter having a casing that bounds a filter interior which is connected by a passage to the clean gas space, wherein the casing has a metallic support member and a metallic filtration member enclosing said support member and supported by said support member, the support member having at least one wire fabric defining gas passages, the filtration member comprising a wire fabric having an inner surface, an outer surface immediately adjacent to the crude gas space, and gas passages, the gas passages of the filtration member having smaller internal widths than the gas passages of the support member, wherein the filtration member rests essentially with the entire inner surface thereof against the support member and is supported by the support member in a dimensionally stable manner, wherein the apparatus further include gas conduction means for passing gas from the crude gas space through the filters into the clean gas space, wherein a cleaning gas inlet and a closure device are associated with each filter for passing cleaning gas into the filter interior and for closing said passage during the passing of cleaning gas into the filter interior, at least one wet cleaning device having a housing projecting from said inner wall into the clean gas space and a spray member displaceable from a rest position into a cleaning position and wherein the spray member is essentially inside the housing in the rest position and projects into the crude gas space in the cleaning position for spraying a cleaning liquid against the outer surface of the filtration member of at least one of the filters.

23. An apparatus as claimed in claim 22, wherein the inner wall has a surface on an upper side and adjacent to the clean gas space, wherein the at least one closure device and the at least one wet cleaning device each have at least one surface adjacent to the clean gas space and on an upper portion of each closure device and each wet cleaning device, and wherein the container is provided with a liquid outlet, and wherein each of said surfaces adjacent to the clean gas space are essentially inclined such that any cleaning liquid reaching said inclined surfaces flows to the liquid outlet and is discharged through the liquid outlet.

24. An apparatus for removing dust from gas, having a container bounding an interior and an inner wall part dividing said interior into a crude gas space and a clean gas space, wherein at least one filter is detachably fastened to said inner wall part, projects therefrom downwards into the crude gas space, and bounds a filter interior which is connected by a connection passage to the clean gas space, further comprising gas conduction members for passing gas from the crude gas space through at least one filter, said at least one filter having a casing with a metallic support member and a metallic filtration member enclosing said support member and supported by said support member, the support member having at least one wire fabric limiting gas passages, the filtration member comprising a wire fabric and having an inner surface, an outer surface immediately adjacent to the crude gas space and gas passages, and the gas passages of the filtration member having smaller internal widths than the gas passages of the support member, wherein the filtration member rests essentially with the entire inner surface thereof against the support member and is supported by the support member in a dimensionally stable manner, wherein said at least one filter has a ring at one end of said filter, wherein the support member and the filtration member are welded or soldered at one end, along the entire circumference of the support member and the filtration member, to the ring, wherein the ring is adjacent to the wall part and is removable therefrom, wherein the support member and the filtration member are welded or soldered at lower ends of said support member and filtration member end facing away from the inner wall part, along the entire circumference of the support member and the filtration member, to a disk which has an upper surface which faces the inner wall part, and is inclined outward and away from the inner wall part wherein the disk has a hole in the center and wherein the filter is detachably fastened to the inner wall part by fastening means passing through the hole i the disk, wherein the disk is welded or soldered to an end wall projecting away from the disk and from the casing and tapering away from the disk and wherein the disk and the end wall are firmly connected to one another by a sleeve which is coaxial with the hole in the disk and has an axial through-hole.

25. An apparatus as claimed in claim 24, wherein the fastening means includes a fastening member which is immediately adjacent to the crude gas space at the lower end of the end wall and accessible in the crude gas space so that the at least one filter is removable downwardly away from the inner wall part.

26. An apparatus for removing dust from gas having a container, an inner wall, a plurality of filters, the container bounding a container interior, the inner wall part dividing said container interior into a crude gas space and a clean gas space, wherein each filter is fastened to the inner wall part, projects into the crude gas space, has a casing, and bounds a filter interior which is connected by a passage to the clean gas space, wherein the casing has a metallic support member and a metallic filtration member enclosing said support member and supported by said support member, the support member having at least one wire fabric limiting gas passages, the filtration member consisting of a wire fabric and having an inner surface, an outer surface immediately adjacent to the crude gas space and gas passages, and the gas passages of the filtration member having smaller internal widths than the gas passages of the support member, wherein the filtration member rests essentially with the entire inner surface thereof against the support member and is supported by the support member in a dimensionally stable manner, wherein the filter interior is connected by a first passage to the clean gas space, the apparatus further having gas conduction means for passing the gas from the crude gas space through the filters and the first passages into the clean gas space, wherein a cleaning gas inlet and a closure device are associated with each filter for passing cleaning gas into the filter interior and for closing said first passage during the passing of cleaning gas into the filter interior, wherein each closure device has a sleeve enclosing the cleaning gas inlet in cross-section and a piston displaceable in said sleeve and connected to a closure member, wherein the sleeve is tightly sealed by an end element on that side of the piston which faces away from the filter, wherein each cleaning gas inlet is rigidly connected to the inner wall part, passes through the associated sleeve, piston, end element and closure member, encloses a second passage connected to the associated filter interior and has at least one hole which connects the second passage to an interior region enclosed by the sleeve and present between the end element and the piston and wherein the second passage has a constriction between the at least one hole and an end located on that side of the piston which faces away from the at least one hole.

27. An apparatus as claimed in claim 26, wherein each cleaning gas inlet has a pipe with an internal thread into which a choke forming the constriction is detachably screwed.

* * * * *